J. H. PHILLIPS.
VEHICLE WHEEL.
APPLICATION FILED AUG. 12, 1910.

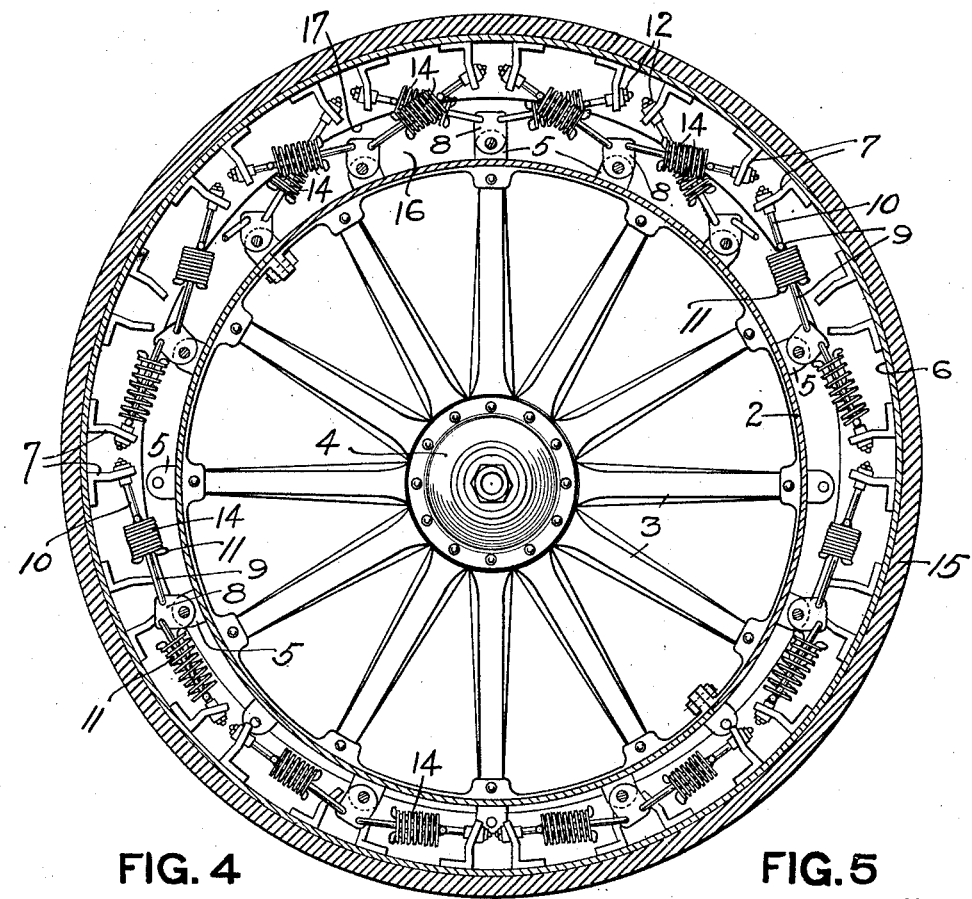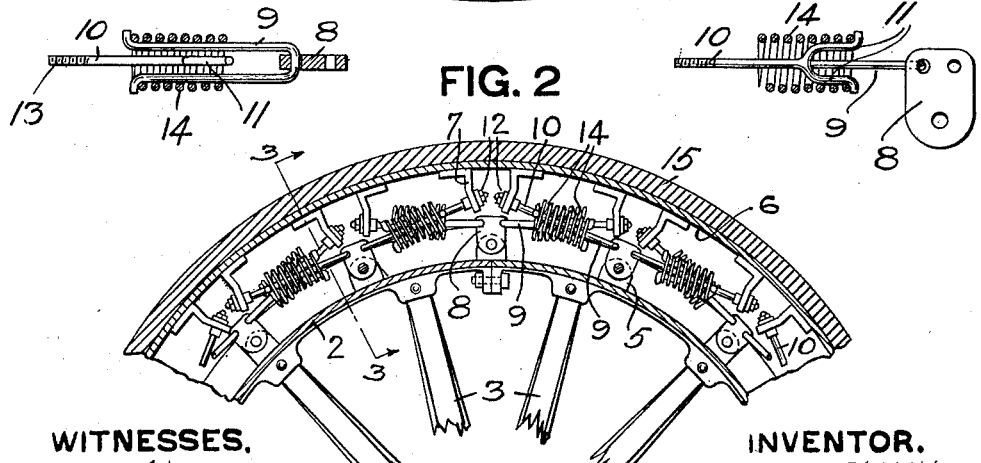

1,007,728.

Patented Nov. 7, 1911.
2 SHEETS—SHEET 2.

WITNESSES.
J. R. Keller
John F. Will

INVENTOR.
John H. Phillips
by
Kay & Totten, attys

UNITED STATES PATENT OFFICE.

JOHN H. PHILLIPS, OF McKEES ROCKS, PENNSYLVANIA, ASSIGNOR OF ONE-HALF TO JOHN H. PHILLIPS, JR., OF McKEES ROCKS, PENNSYLVANIA.

VEHICLE-WHEEL.

1,007,728. Specification of Letters Patent. Patented Nov. 7, 1911.

Application filed August 12, 1910. Serial No. 576,890.

*To all whom it may concern:*

Be it known that I, JOHN H. PHILLIPS, a resident of McKees Rocks, in the county of Allegheny and State of Pennsylvania, have invented a new and useful Improvement in Vehicle-Wheels; and I do hereby declare the following to be a full, clear, and exact description thereof.

My invention relates to wheels adapted for automobiles, carriages and other vehicles.

The object of my invention is to provide a wheel of a resilient character which will have the characteristics of a pneumatic wheel, and yet be free from all the disadvantages and difficulties which attend the use of such wheels due to punctures, &c.

To these ends my invention comprises the novel features hereinafter set forth and claimed.

Figure 3:
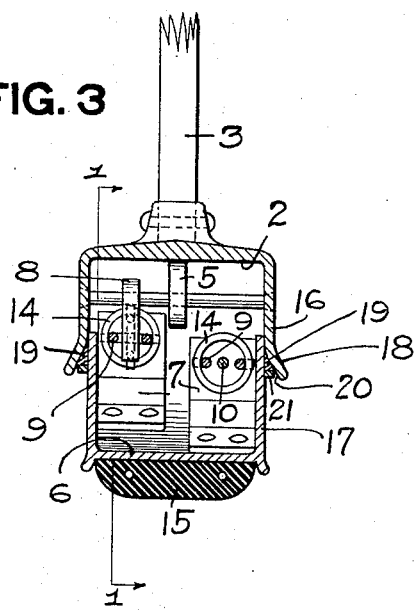
Figure 7:
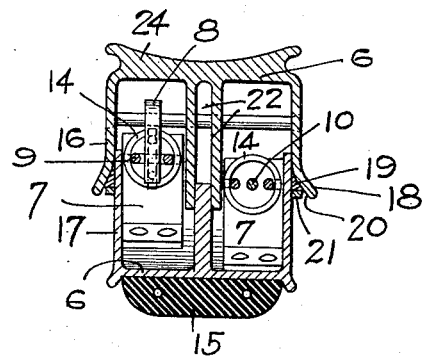
Figure 6:
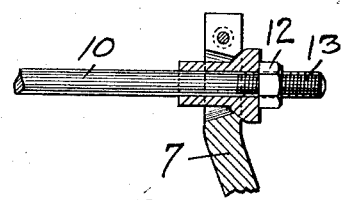

In the accompanying drawings Figure 1 is a sectional elevation of my improved wheel showing it under a load or depressed; Fig. 2 is a like view of a portion of a wheel in normal position; Fig. 3 is a cross section on the line 3—3 Fig. 2; Figs. 4, 5 and 6 are details of the spring devices; and Fig. 7 is a modified form of my invention.

The numeral 2 designates the inner rim of my improved wheel with the spokes 3 connected up to the hub 4. At intervals on the outer periphery of the rim 2 are the lugs 5. The outer rim 6 has the brackets 7 secured to the inner face thereof. Pivoted to the lugs 5 of the inner rim 2 are the plates 8. Secured to the plates 8 at the outer end thereof are the U-shaped links 9. Connected to the brackets 7 of the outer rim 6 are the links 10 which have the bifurcated ends 11. The links 10 pass through openings in the brackets 7 and the nuts 12 engage the threaded ends 13 of said links 10. Springs 14 are interposed between the ends of the links 9 and the ends of the links 10. The outer periphery of the rim 7 has the solid rubber tire 15 secured thereto.

The rims 2 and 6 have the overlapping sides 16 and 17 respectively, and these side portions move over each other in a radial direction when the wheel is under compression, as hereinafter set forth. In order to properly pack the joint between the overlapping side plates 16 and 17 of the rims, the plates 16 are flared slightly as at 18 to form an annular groove 20 to receive the packing 19, which may be formed of rubber or other suitable material. This packing is inserted in the groove 20, and in order to hold said packing in position, a spring retaining ring 21 is employed which is adapted to be sprung into position to hold the packing securely in place. This packing forms a practically dust-proof joint between the overlapping rims. The springs above described are inserted in the space formed within these overlapping rims, and there may be a single row or any desired number of rows of springs inside of this casing. I have illustrated two rows, and in this case the rows will be separated by inner flanges or partitions 22 working in each other. When the two rows of springs are employed, the brackets 7 of one row will be in line with the lugs 5 of the other row. A portion of a second row of springs is shown in Fig. 1.

In the normal position of the wheel as indicated in Fig. 2 the springs will take the position indicated therein, and the links and springs will be all in alinement. When, however, the wheel is depressed, as indicated in Fig. 1 some of the springs will be compressed and others extended as indicated. There is always a positive connection between the inner and the outer rim so that in the case of the fracturing or breaking of a spring, the spring will still be held in position, and cannot escape from the links, while the links will act to hold the rims together and so prevent any serious results from the breaking of a spring.

In Fig. 7 I have illustrated a modified form of my invention in which the clencher band 24 is employed in connection with the inner rim so that it will be secured to the wheel in the ordinary manner.

What I claim is:

1. In a wheel, the combination of an outer rim and an inner rim movable radially with reference to each other, links connected in pairs to said rims, said links being normally in alinement with each other and at right angles to a line extending radially from said wheel, one link of a pair connected to the outer rim, the other link connected to the inner rim, the free ends of said links having abutments, and a spring encircling said links and engaging said abutments.

2. In a wheel, the combination of an outer rim and an inner rim movable radially with reference to each other, links connected in pairs to said rims, one link of a pair connected to the outer rim, swinging plates on said inner rim to which the other link of each pair is connected, the free ends of said links having abutments, and a spring encircling said links and engaging said abutments.

3. In a wheel, the combination of an outer rim and an inner rim movable radially with reference to each other, swinging plates on said inner rim, U-shaped links engaging said plates, links connected to said outer rims, said links having abutments at their free ends and a spring interposed between the abutments on the free ends of said links.

4. In a wheel, the combination with an outer rim and an inner rim movable radially with reference to each other, swinging plates on said inner rim, U-shaped links engaging said plates, brackets on said outer rim, links engaging openings in said brackets, said links having abutments at their free ends, a spring interposed between the free ends of said links, and nuts engaging the links of said outer rim.

In testimony whereof, I, the said JOHN H. PHILLIPS, have hereunto set my hand.

JOHN H. PHILLIPS.

Witnesses:
JOHN D. MEYER,
E. A. SIEFFERT.

Copies of this patent may be obtained for five cents each, by addressing the "Commissioner of Patents, Washington, D. C."